United States Patent
Parichehrehteroujeni et al.

(10) Patent No.: US 12,010,569 B2
(45) Date of Patent: Jun. 11, 2024

(54) PROVIDING BEAM INFORMATION

(71) Applicant: Telefonaktiebolaget LM Ericsson (publ), Stockholm (SE)

(72) Inventors: Ali Parichehrehteroujeni, Linköping (SE); Pradeepa Ramachandra, Linköping (SE); Wei Shen, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/441,747

(22) PCT Filed: Feb. 4, 2020

(86) PCT No.: PCT/SE2020/050100
§ 371 (c)(1),
(2) Date: Sep. 22, 2021

(87) PCT Pub. No.: WO2020/218959
PCT Pub. Date: Oct. 29, 2020

(65) Prior Publication Data
US 2022/0095181 A1 Mar. 24, 2022

Related U.S. Application Data

(60) Provisional application No. 62/838,219, filed on Apr. 24, 2019.

(51) Int. Cl.
*H04W 36/00* (2009.01)
(52) U.S. Cl.
CPC . *H04W 36/00835* (2018.08); *H04W 36/0058* (2018.08); *H04W 36/0072* (2013.01)
(58) Field of Classification Search
CPC . H04W 24/02; H04W 24/10; H04W 36/0058; H04W 36/0072;
(Continued)

(56) References Cited

U.S. PATENT DOCUMENTS

2011/0300866 A1 12/2011 Ali et al.
2013/0281063 A1* 10/2013 Jactat .............. H04W 24/10
455/411
(Continued)

FOREIGN PATENT DOCUMENTS

WO WO-2018175891 A1 * 9/2018 ........... H04L 1/0026
WO 2018185657 A1 10/2018
WO 2019064258 A1 4/2019

OTHER PUBLICATIONS

International Search Report and Written Opinion of the International Searching Authority for PCT International Application No. PCT/SE2020/050100 dated Apr. 14, 2020.
(Continued)

*Primary Examiner* — Matthew W Genack
(74) *Attorney, Agent, or Firm* — Sage Patent Group

(57) ABSTRACT

Methods to operate a wireless device in a wireless communication network are discussed. Respective signal qualities of a plurality of cells of the wireless communication network are determined. The plurality of cells are ranked based on the respective signal qualities of the plurality of cells. Measurement information for at least one of the plurality of cells is logged in memory of the wireless device based on ranking the plurality of cells, wherein the measurement information includes a cell identity and beam information for the at least one of the plurality of cells. A report is transmitted to the wireless communication network, wherein the report includes the measurement information.

Related wireless devices and computer programs are also discussed.

22 Claims, 16 Drawing Sheets

(58) Field of Classification Search
CPC ....... H04W 36/00835; H04W 36/0085; H04W 36/0088; H04W 36/0094; H04W 72/06
See application file for complete search history.

(56) References Cited

U.S. PATENT DOCUMENTS

2017/0324459 A1* 11/2017 Koskela ............... H04B 7/0617
2018/0288666 A1* 10/2018 Fujishiro ............... H04W 48/20

OTHER PUBLICATIONS

Ericsson, "MDT Overview," R3-190826, 3GPP TSG-RAN WG3 #103, Athens, Greece, Feb. 25-Mar. 1, 2019, 12 pages.

Ericsson, "Details of beam level measurements to be included in MDT," R2-1904009, 3GPP TSG-RAN WG2 #105bis, Xi'an, China, Apr. 8-Apr. 12, 2019, 6 pages.

Ericsson, "Cell quality derivation for idle/inactive UEs," R2-1700345 (listed as R2-1800345 on ISR), 3GPP TSG-RAN WG2 NR AH#3, Vancouver, Canada, Jan. 22-26, 2018, 6 pages.

3GPP TS 38.133 V15.5.0, "3rd Generation Partnership Project; Technical Specification Group Radio Access Network; NR; Requirements for support of radio resource management (Release 15)," Technical Specification, Mar. 2019, 893 pages.

3GPP TS 38.331 V15.5.0, "3rd Generation Partnership Project; Technical Specification Group Radio Access Network; NR; Radio Resource Control (RRC) protocol specification (Release 15)," Technical Specification, Mar. 2019, 491 pages.

3GPP TR 36.805 V9.0.0, "3rd Generation Partnership Project; Technical Specification Group Radio Access Network; Study on Minimization of drive-tests in Next Generation Networks; (Release 9)," Technical Report, Dec. 2009, 24 pages.

* cited by examiner

PROVIDING BEAM INFORMATION

CROSS REFERENCE TO RELATED APPLICATIONS

This application is a 35 U.S.C. § 371 national stage application of PCT International Application No. PCT/SE2020/050100 filed on Feb. 4, 2020, which claims the benefit of U.S. Provisional Patent Application Ser. No. 62/838,219, filed on Apr. 24, 2019, the disclosures and content of which are incorporated by reference herein in their entireties.

TECHNICAL FIELD

The present disclosure relates generally to communications, and more particularly to communication methods and related devices, nodes and computer programs supporting wireless communications.

BACKGROUND

Minimizing Drive Test MDT was first studied in Rel-9 (TR 36.805) driven by RAN2 with the purpose to reduce/minimize the actual drive tests. MDT has been introduced since Rel-10 in Long Term Evolution LTE. MDT has not been specified for New Radio NR in the involved standards in RAN2, RAN3 and SA5 groups. The use cases in the TR 36.805 may include: Coverage optimization/improvement; Mobility optimization/improvement; Capacity optimization/improvement; Parameterization for common channels; and/or Quality of Service QoS verification.

Normal Radio Resource Management RRM mechanisms may only allow for measurements to be reported when the UE has Radio Resource Control RRC connection with the particular cell, and there is sufficient UpLink UL coverage to transport the MEASUREMENT REPORT. This may restrict measurements to be collected from UEs not experiencing Radio Link Failure RLF and experiencing sufficient UL coverage. Besides, there may be no accompanying location information in normal RRM measurements.

MDT types based on RRC states may include Logged MDT and Immediate MDT. In general, there are two types of MDT measurement logging, i.e., Logged MDT and Immediate MDT.

Logged MDT is discussed below.

A UE in RRC_IDLE state is configured to perform periodical MDT logging after receiving the MDT configurations from the network. The UE shall report the DownLink DL pilot strength measurements (Reference Signal Receiver Power RSRP and/or Reference Signal Received Quality RSRQ) together with time information, detailed location information if available, and Wireless Local Area Network WLAN, Bluetooth to the network via using the UE information framework when it is in RRC_CONNECTED state. The DL pilot strength measurement of Logged MDT is collected based on the existing measurements required for cell reselection purpose, without imposing on the UE to perform additional measurements.

Table 1 below illustrates measurement logging for Logged MDT.

| MDT mode | RRC states | Measurement quantities |
|---|---|---|
| Logged MDT | RRC_IDLE | RSRP and RSRQ of the serving cell and available UE measurements for intra-frequency/inter-frequency/inter-RAT, time stamp and detailed location information if available. |

For Logged MDT, the wireless device UE receives the MDT configurations including logginginterval and loggingduration in the RRC message, i.e., LoggedMeasurementConfiguration, from the network. A timer (T330) is started at the UE upon receiving the configurations and set to loggingduration (10 min-120 min). The UE shall perform periodical MDT logging with the interval set to logginginterval (1.28 s-61.44 s) when the UE is in RRC_IDLE.

An example of the MDT logging is shown in FIG. 1. At 101, the UE in RRC_CONNECTED receives MDT configurations and starts timer T330. At 102, the UE enters RRC_IDLE and starts periodic MDT logging. At 103, the UE performs MDT logging. At 104, the UE stops MDT logging and the timer T330 is kept running. At 105, the UE restarts periodic logging.

Immediate MDT is discussed below.

Measurements for Immediate MDT purpose can be performed by the radio access network RAN and the wireless device UE. There are a number of measurements (M1-M9) which are specified for RAN measurements and UE measurements. For UE measurements, the MDT configuration is based on the existing RRC measurement procedures for configuration and reporting with some extensions for location information. The measurement quantities for Immediate MDT are shown below in table 2.

| MDT mode | RRC states | Measurement quantities |
|---|---|---|
| Immediate MDT | RRC_CONNECTED | M1: RSRP and RSRQ measurement by UE.<br>M2: Power Headroom measurement by UE.<br>M3: Received Interference Power measurement by eNB.<br>M4: Data Volume measurement separately for DL and UL, per QCI per UE, by eNB.<br>M5: Scheduled IP Throughput for MDT measurement separately for DL and UL, per RAB per UE and per UE for the DL, per UE for the UL, by eNB.<br>M6: Packet Delay measurement, separately for DL and UL, per QCI per UE, see UL PDCP Delay, by the UE, and Packet Delay in the DL per QCI, by the eNB.<br>M7: Packet Loss rate measurement, separately for DL and UL per QCI per UE, by the eNB.<br>M8: RSSI measurement by UE.<br>M9: RTT measurement by UE. |

The reporting of the Immediate MDT may be specified as follows. For M1, Event-triggered measurement reports may be provided according to existing RRM configuration for events A1, A2, A3, A4, A5 A6, B1 or B2, or Periodic, A2 event-triggered, or A2 event triggered periodic measurement reports may be provided according to an MDT specific measurement configuration. For M2, Reception of Power Headroom Report (PHR) may be provided according to existing RRM configuration. For M3-M9, reports may be provided at an end of a measurement collection period.

Logged MBSFN MDT and RLF Enhancement are discussed below.

Logged multicast-broadcasting single-frequency network MBSFN MDT is defined to perform measurement logging when a UE is in RRC_IDLE and RRC_CONNECTED. An enhancement on Radio Link Failure (RLF) is also specified for RLF report with detailed location information (e.g., Global Navigation Satellite System GNSS) if available. RLF reports may also include available WLAN measurement results and/or Bluetooth measurement results for calculating UE location. The measurement quantities for Logged MBSFN MDT and RLF Enhancement are shown below in table 3 which illustrates measurement quantities for Logged MBSFN MDT and RLF Enhancement.

| MDT mode | RRC states | Measurement quantities |
|---|---|---|
| Logged MBSFN MDT | RRC_IDLE, RRC_CONNECTED | RSRP, RSRQ, MBSFN RSRP, MBSFN RSRQ, BLER for signalling and BLER for data per MCH |
| RLF Enhancement | RRC_CONNECTED | RLF report with detailed location information (e.g., GNSS); RLF reports may also include available WLAN measurement results and/or Bluetooth measurement results for calculating UE location. |

Control and Configuration of MDT is discussed below.

When MDT was introduced in Rel-10, it was decided to include MDT as a part of the Trace function which is able to provide very detailed logging data at call level. Based on the methods of activating/deactivating trace and trace configuration, the trace function can be classified into the following two aspects: management activation/deactivation; and signalling based activation/deactivation. For management activation/deactivation, a Trace Session is activated/deactivated in different Network Elements (NE) directly from the Element Manager (EM) using the management interfaces of those NEs. For signalling based activation/deactivation, a Trace Session is activated/deactivated in different NEs using the signalling interfaces between those elements so that the NEs may forward the activation/deactivation originating from the EM.

On the other hand, the MDT can be classified as Area-based MDT and Signalling-based MDT from the use case perspective discussed as follows.

For area based MDT, MDT data is collected from UEs in a specified area. The area is defined as a list of cells (UTRAN or E-UTRAN) or as a list of tracking/routing/location areas. The area-based MDT is an enhancement of the management-based trace functionality. Area based MDT can be either a logged MDT or Immediate MDT.

For signalling based MDT, MDT data is collected from one specific UE. The UE that is participating in the MDT data collection is specified as IMEI(SV) or as IMSI. The signalling based MDT is an enhancement of the signalling based subscriber and equipment trace. The signalling based MDT can be either a logged MDT or Immediate MDT.

In LTE, for Area based MDT, the MDT control and configuration parameters are sent by the Network Management directly to the eNB. Then, the eNB selects UEs which fulfil the criteria including the area scope and the user consent and starts the MDT. For signaling-based MDT, i.e., UE specific MDT, the MDT control and configuration parameters are sent by the Network Management to MME which then forwards the parameters to eNB associated with the specific UE.

FIG. 2 summarizes the classification of the MDT.

Location Information is discussed below.

The Logged MDT measurements are tagged by the UE with location data in the following manner E-UTRAN Cell Global Identifier ECGI or Cell-Id of the serving cell when the measurement was taken is always included. Detailed location information (e.g. GNSS location information) is included if available in the UE when the measurement was taken. If detailed location information is available, the reporting shall consist of latitude and longitude. Depending on availability, altitude, uncertainty and confidence may be also additionally included. The UE tags available detailed location information only once with upcoming measurement sample, and then the detailed location information is discarded, i.e., the validity of detailed location information is implicitly assumed to be one logging interval.

For Immediate MDT, the M1 measurements are tagged by the UE with location data in the following manner Detailed location information (e.g. GNSS location information) is included if available in the UE when the measurement was taken. If detailed location information is available, the reporting shall consist of latitude and longitude. Depending on availability, altitude, uncertainty and confidence may be also additionally included. The UE should include the available detailed location information only once. If the detailed location information is obtained by GNSS positioning method, GNSS time information shall be included. For both event-based and periodic reporting, the detailed location information is included if the report is transmitted within the validity time after the detailed location information was obtained. The validity evaluation of detailed location information is left to UE implementation.

User consent handling is discussed below.

For signalling based MDT, the Core Network (CN) shall not initiate MDT towards a particular user unless the user consent is available.

For area-based MDT, the core network CN indicates to the radio access network RAN whether MDT is allowed to be configured by the RAN for this user considering, e.g. user consent and roaming status, by providing management-based MDT allowed information consisting of the Management Based MDT Allowed indication and optionally the Management Based MDT PLMN List. The management-based MDT allowed information propagates during inter-PLMN handover if the Management Based MDT PLMN List is available and includes the target PLMN.

The same user consent information can be used for area-based MDT and for signaling-based MDT, i.e. there is no need to differentiate the user consent per MDT type. Collecting the user consent shall be done via customer care process. The user consent information availability shall be considered as part of the subscription data and as such this shall be provisioned to the Home Subscriber Server (HSS) database.

Cell selection and reselection is discussed below.

UE shall perform measurements for cell selection and reselection purposes as specified in TS 38.133. When evaluating Srxlev and Squal of non-serving cells for reselection evaluation purposes, the UE shall use parameters provided by the serving cell and for the final check on cell selection criterion, the UE shall use parameters provided by the target cell for cell reselection.

The NAS can control the RAT(s) in which the cell selection should be performed, for instance by indicating RAT(s) associated with the selected PLMN, and by maintaining a list of forbidden registration area(s) and a list of equivalent PLMNs. The UE shall select a suitable cell based on RRC_IDLE or RRC_INACTIVE state measurements and cell selection criteria.

In order to expedite the cell selection process, stored information for several RATs, if available, may be used by the UE.

When camped on a cell, the UE shall regularly search for a better cell according to the cell reselection criteria. If a better cell is found, that cell is selected. The change of cell may imply a change of RAT. Details on performance requirements for cell reselection can be found in TS 38.133.

The NAS is informed if the cell selection and reselection result in changes in the received system information relevant for NAS.

For normal service, the UE shall camp on a suitable cell, monitor control channel(s) of that cell so that the UE can:
receive system information from the PLMN; and
receive registration area information from the PLMN, e.g., tracking area information; and
receive other AS and NAS Information; and
if registered:
receive paging and notification messages from the PLMN; and
initiate transfer to Connected mode.

For cell selection in multi-beam operations, measurement quantity of a cell is up to UE implementation.

For cell reselection in multi-beam operations, the measurement quantity of this cell is derived amongst the beams corresponding to the same cell based on SS/PBCH block as follows:
if nrofSS-BlocksToAverage is not configured in SIB2; or
if absThreshSS-BlocksConsolidation is not configured in SIB2; or
if the highest beam measurement quantity value is below or equal to absThreshSS-BlocksConsolidation:
derive a cell measurement quantity as the highest beam measurement quantity value, where each beam measurement quantity is described in TS 38.215 [11].
else:
derive a cell measurement quantity as the linear average of the power values of up to nrofSS-BlocksToAverage of highest beam measurement quantity values above absThreshSS-BlocksConsolidation.

To exemplify, as shown in FIG. 3, the coverage area of cell-A can be derived based on the coverage area of SSB beams A1 to A3 and the coverage area of cell-B can be derived based on the coverage area of SSB beams B1 to B3. Generally, when the UE calculates the quality of the cells, it needs additional configuration on how to combine these beam level measurements into a cell level quality measurement. This is captured in the section 5.5.3.3 of the NR RRC specification 38.331. In summary, the cell quality can be derived either based on the strongest beam or based on the average of up to 'X' strongest beams that are above a threshold 'T' (referred to as a suitability threshold). These options can assist to reduce/prevent potential ping-pong handover that can arise when only the strongest beam is used for cell quality derivation when the UE is in connected mode. However, an averaging based configuration can result in a UE being in a sub optimal cell, in particular when establishing a connection in idle mode. In the end, the agreement was that the network can configure the UE with any of these options depending on which option suits best in terms of the radio condition within the cell's coverage area. In addition, in our understanding network can learn to improve/optimize these configuration parameters based on the accessibility measurements.

With the same reasoning, cell selection for establishment and suitability threshold would affect the performance of RACH procedure and hence sub optimal values for such parameters may cause additional delay in RACH process and or increase the RACH failure rate.

Intra-frequency and equal priority inter-frequency Cell Reselection criteria are discussed below, where the cell-ranking criterion Rs for serving cell and Rn for neighbouring cells (collectively referred to as R values) is defined by:

$$R_s = Q_{meas,s} + Q_{hyst} - Qoffset_{temp}$$

$$R_n = Q_{meas,n} - Qoffset - Qoffset_{temp}$$

where:
$Q_{meas}$, Qoffset, and $Qoffset_{temp}$ are illustrated below in Table 4.

| | |
|---|---|
| $Q_{meas}$ | RSRP measurement quantity used in cell reselections. |
| Qoffset | For intra-frequency: Equals to $Qoffset_{s,\,n}$, if $Qoffset_{s,\,n}$ is valid, otherwise this equals to zero. For inter-frequency: Equals to $Qoffset_{s,\,n}$ plus $Qoffset_{frequency}$, if $Qoffset_{s,\,n}$ is valid, otherwise this equals to $Qoffset_{frequency}$. |
| $Qoffset_{temp}$ | Offset temporarily applied to a cell as specified in TS 38.331 [3]. |

The UE shall perform ranking of all cells that fulfill the cell selection criterion S, which is defined in 5.2.3.2.

The cells shall be ranked according to the R criteria specified above by deriving $Q_{meas,n}$ and $Q_{meas,s}$ and calculating the R values using averaged RSRP results.

If rangeToBestCell is not configured, the UE shall perform cell reselection to the highest ranked cell. If this cell is found to be not-suitable, the UE shall behave according to subclause 5.2.4.4.

If rangeToBestCell is configured, then the UE shall perform cell reselection to the cell with the highest number of beams above the threshold (i.e. absThreshSS-BlocksConsolidation) among the cells whose R value is within rangeToBestCell of the R value of the highest ranked cell. If there are multiple such cells, the UE shall perform cell reselection to the highest ranked cell among them. If this cell is found to be not-suitable, the UE shall behave according to subclause 5.2.4.4.

In all cases, the UE shall reselect the new cell, only if the following conditions are met:
the new cell is better than the serving cell according to the cell reselection criteria specified above during a time interval $TreselectionR_{AT}$;
more than 1 second has elapsed since the UE camped on the current serving cell.

Cell reselection criterion based on rangeToBestCell is discussed below.

Apart from the above-mentioned parameters (namely nrofSS-BlocksToAverage and absThreshSS-BlocksConsolidation) there is another parameter called rangeToBestCell in which may have significant impact on the final decision of UE when evaluating cell quality as part of the cell reselection procedure.

The rangeToBestCell specifies the R value range which the cells whose R value is within the range can be a candidate for the highest ranked cell. It is configured in SIB2 and used for intra-frequency and equal priority inter-frequency cell reselection and among the cells on the highest priority frequency(ies) for inter-frequency cell reselection within NR.

Further improvement to configure cell selection/reselection parameters, however, may be desired.

SUMMARY

According to some embodiments of inventive concepts, methods may be provided to operate a wireless device in a wireless communication network. Respective signal qualities of a plurality of cells of the wireless communication network are determined. The plurality of cells are ranked based on the respective signal qualities of the plurality of cells. Measurement information for at least one of the plurality of cells is logged in memory of the wireless device based on ranking the plurality of cells, wherein the measurement information includes a cell identity and beam information for the at least one of the plurality of cells. A report is transmitted to the wireless communication network, wherein the report includes the measurement information.

Further embodiments of inventive concepts, include wireless devices, computer programs and computer program products corresponding to the above methods.

By providing measurement information to the wireless communication network according to some embodiments disclosed herein, the wireless communication network may be better able to analyze coverage, adjust cell operation, and/or configure cell selection/reselection parameters.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 5:
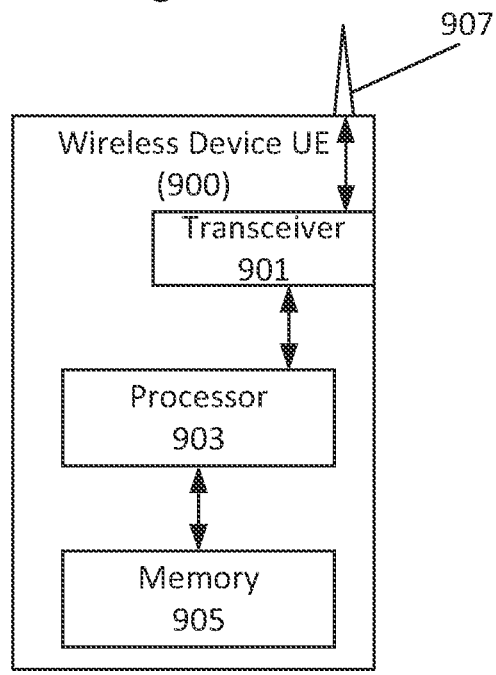
FIG. 5 is a block diagram illustrating a wireless device UE according to some embodiments of inventive concepts.

FIG. 5 is a block diagram illustrating elements of a wireless device UE 900 (also referred to as a mobile terminal, a mobile communication terminal, a wireless communication device, a wireless terminal, mobile device, a wireless communication terminal, user equipment, UE, a user equipment node/terminal/device, etc.) configured to provide wireless communication according to embodiments of inventive concepts. (Wireless device 900 may be provided, for example, as discussed below with respect to wireless device QQ110 of FIG. 9.) As shown, wireless device UE may include an antenna 907 (e.g., corresponding to antenna QQ111 of FIG. 9), and transceiver circuitry 901 (also referred to as a transceiver, e.g., corresponding to interface QQ114 of FIG. 9) including a transmitter and a receiver configured to provide uplink and downlink radio communications with a base station(s) (e.g., corresponding to network node QQ160 of FIG. 9, also referred to as a RAN node) of a radio access network. Wireless device UE may also include processing circuitry 903 (also referred to as a processor, e.g., corresponding to processing circuitry QQ120 of FIG. 9) coupled to the transceiver circuitry, and memory circuitry 905 (also referred to as memory, e.g., corresponding to device readable medium QQ130 of FIG. 9) coupled to the processing circuitry. The memory circuitry 905 may include computer readable program code that when executed by the processing circuitry 903 causes the processing circuitry to perform operations according to embodiments disclosed herein. According to other embodiments, processing circuitry 903 may be defined to include memory so that separate memory circuitry is not required. Wireless device UE may also include an interface (such as a user interface) coupled with processing circuitry 903, and/or wireless device UE may be incorporated in a vehicle.

As discussed herein, operations of wireless device UE may be performed by processing circuitry 903 and/or transceiver circuitry 901. For example, processing circuitry 903 may control transceiver circuitry 901 to transmit communications through transceiver circuitry 901 over a radio interface to a radio access network node (also referred to as a base station) and/or to receive communications through transceiver circuitry 901 from a RAN node over a radio interface. Moreover, modules may be stored in memory circuitry 905, and these modules may provide instructions so that when instructions of a module are executed by processing circuitry 903, processing circuitry 903 performs respective operations (e.g., operations discussed below with respect to Example Embodiments relating to wireless devices).

Figure 6:
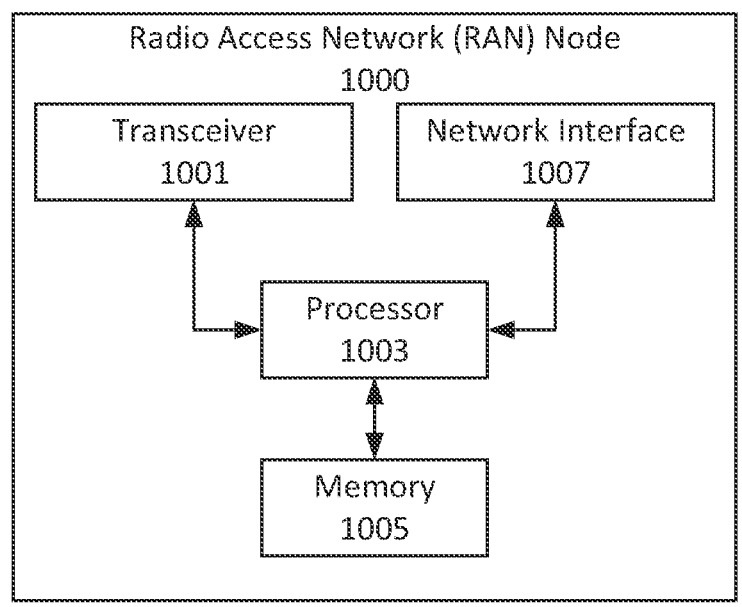
FIG. 6 is a block diagram illustrating a radio access network RAN node (e.g., a base station eNB/gNB) according to some embodiments of inventive concepts.

FIG. 6 is a block diagram illustrating elements of a radio access network RAN node 1000 (also referred to as a network node, base station, eNodeB/eNB, gNodeB/gNB, etc.) of a Radio Access Network (RAN) configured to provide cellular communication according to embodiments of inventive concepts. (RAN node 1000 may be provided, for example, as discussed below with respect to network node QQ160 of FIG. 9.) As shown, the RAN node may include transceiver circuitry 1001 (also referred to as a transceiver, e.g., corresponding to portions of interface QQ190 of FIG. 9) including a transmitter and a receiver configured to provide uplink and downlink radio communications with mobile terminals. The RAN node may include network interface circuitry 1007 (also referred to as a network interface, e.g., corresponding to portions of interface QQ190 of FIG. 9) configured to provide communications with other nodes (e.g., with other base stations) of the RAN and/or core network CN. The network node may also include processing circuitry 1003 (also referred to as a processor, e.g., corresponding to processing circuitry QQ170) coupled to the transceiver circuitry, and memory circuitry 1005 (also referred to as memory, e.g., corresponding to device readable medium QQ180 of FIG. 9) coupled to the processing circuitry. The memory circuitry 1005 may include computer readable program code that when executed by the processing circuitry 1003 causes the processing circuitry to perform operations according to embodiments disclosed herein. According to other embodiments, processing circuitry 1003 may be defined to include memory so that a separate memory circuitry is not required.

As discussed herein, operations of the RAN node may be performed by processing circuitry 1003, network interface 1007, and/or transceiver 1001. For example, processing circuitry 1003 may control transceiver 1001 to transmit downlink communications through transceiver 1001 over a radio interface to one or more mobile terminals UEs and/or to receive uplink communications through transceiver 1001 from one or more mobile terminals UEs over a radio interface. Similarly, processing circuitry 1003 may control network interface 1007 to transmit communications through network interface 1007 to one or more other network nodes and/or to receive communications through network interface from one or more other network nodes. Moreover, modules may be stored in memory 1005, and these modules may provide instructions so that when instructions of a module are executed by processing circuitry 1003, processing circuitry 1003 performs respective operations (e.g., operations discussed below with respect to Example Embodiments relating to RAN nodes).

According to some other embodiments, a network node may be implemented as a core network CN node without a transceiver. In such embodiments, transmission to a wireless device UE may be initiated by the network node so that transmission to the wireless device is provided through a network node including a transceiver (e.g., through a base station or RAN node). According to embodiments where the network node is a RAN node including a transceiver, initiating transmission may include transmitting through the transceiver.

Figure 7:
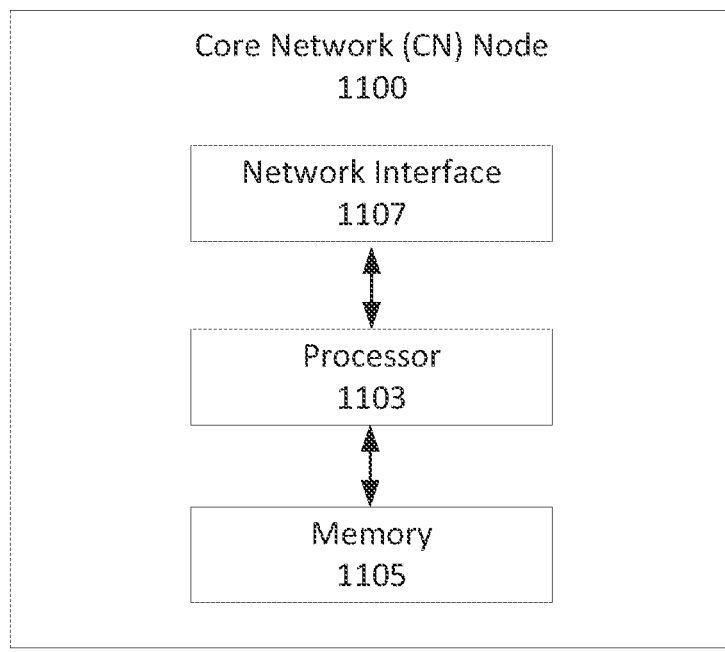
FIG. 7 is a block diagram illustrating a core network CN node (e.g., an AMF node, an SMF node, an OAM node, etc.) according to some embodiments of inventive concepts.

FIG. 7 is a block diagram illustrating elements of a core network CN node (e.g., an SMF node, an AMF node, an O&M node, etc.) of a communication network configured to provide cellular communication according to embodiments of inventive concepts. As shown, the CN node may include network interface circuitry 1107 (also referred to as a network interface) configured to provide communications with other nodes of the core network and/or the radio access network RAN. The CN node may also include a processing circuitry 1103 (also referred to as a processor) coupled to the network interface circuitry, and memory circuitry 1105 (also referred to as memory) coupled to the processing circuitry. The memory circuitry 1105 may include computer readable program code that when executed by the processing circuitry 1103 causes the processing circuitry to perform operations according to embodiments disclosed herein. According to other embodiments, processing circuitry 1103 may be defined to include memory so that a separate memory circuitry is not required.

As discussed herein, operations of the CN node may be performed by processing circuitry 1103 and/or network interface circuitry 1107. For example, processing circuitry 1103 may control network interface circuitry 1107 to transmit communications through network interface circuitry 1107 to one or more other network nodes and/or to receive communications through network interface circuitry from one or more other network nodes. Moreover, modules may be stored in memory 1105, and these modules may provide instructions so that when instructions of a module are executed by processing circuitry 1103, processing circuitry 1103 performs respective operations (e.g., operations discussed below with respect to Example Embodiments relating to core network nodes).

According to some embodiments of inventive concepts, methods may be provided to log beam level measurements and beam IDs as part of measurements for logged MDT that can assist the OAM (Operations, Administration, and Maintenance function/node) in configuring the cell selection and reselection parameters (e.g., nrofSS-BlocksToAverage and absThreshSS-BlocksConsolidation, rangeToBestCell) to help the UEs being connected to the appropriate/optimal cells.

Beam information in logged MDT is discussed below.

In RAN2 #105 meeting, it was agreed to include MDT for NR and some of the measurements to be included as part of the MDT contents are also agreed.

Agreements:
1. For Immediate MDT, the measurement quantities should consider both cell-level RSRP/RSRQ/SINR and BRSRP/BRSRQ/BSINR. The details about BRSRP/BRSRQ/BSINR for the serving cell and neighbour cells can be further studied.
2. From RAN2 perspective both Management-based MDT & signaling-based MDT can be either Logged MDT or Immediate MDT.
3. For Signaling-based MDT in NR, the user consent is required as in LTE.

As part of the agreements, it was kept as FFS as to whether the beam level measurements are included in the logged MDT and whether beam level measurements of serving cells are also included in the measurement report or not.

PPS: For Logged MDT, the beam-level RSRP/RSRQ should be included in the measurement logging together with cell-level RSRP/RSRQ. The details about the number of BRSRP/BRSRQ values for the serving cell and neighbor cells can be further studies.

Additionally, in RAN2 #105bis meeting, it was agreed that the UE includes the best beam index of the camped cell as part of the logged MDT report.

Agreements:
1 It is supported that best beam index (SSB index) of the camped cell as part of the logged MDT report. Other measurements are FFS.

Further, several companies have expressed an interest to include beam level RSRP also as part of the logged measurement report.

As part of the cell reselection criterion, the rangeToBestCell is used wherein all the cells that are within a certain threshold (as indicated by rangeToBestCell) are considered as candidates for re-selection. Amongst these cells, only that cell which had the highest number of good beams is considered as the candidate for re-selection. Based on this, two cell that have similar RSRP at a given geographical location might have 'different coverage' depending on whether only one beam from that cell is covering that region or many beams are covering that region.

Therefore, the impact of 'number of good beams' used in conjunction with 'rangeToBestCell' may not be visible to the OAM to analyze the coverage of a cell.

According to some embodiments of inventive concepts, a UE which is configured with logged MDT shall log the number of good beams associated with candidate neighbor cells at the time of performing the logged MDT related logging.

According to some embodiments of inventive concepts, the OAM that receives the logged MDT may get to know why a UE selected a particular cell as the serving cell in spite of having poorer cell quality compared to another cell (as the other cell had more good beams). This information may be useful for the coverage analysis of a given cell.

According to some embodiments of inventive concepts, the network may be able to fine tune the rangeToBestCell and the threshold associated with 'good beam' definition.

Some embodiments of inventive concepts may provide methods wherein a wireless device (e.g., User Equipment UE, also referred to as a wireless terminal) logs the number of good beams associated with the serving and neighboring cells based on the measurements for cell reselection and information during the cell reselection evaluation, as part of logged MDT.

The UE may log a number of good beams associated with the serving and neighboring cells in every MDT logginginterval which is configured by the network as a part of the logged MDT.

The UE may only perform the logging at a predefined event occasion (e.g., after a cell reselection).

According to some embodiments of inventive concepts, as part of log MDT configuration, the network can configure the UE to log/store one (or more) of the following information for the cells within the rangeToBestCell of the R value (or RSRP) of the highest ranked cell. The "number of good beams" associated with the cells within the rangeToBestCell may be logged as part of beam level measurement. The beam indexes associated with the cells within the rangeToBest-Cells may be logged as part of beam level measurement. At least one of the beam quality measurement in terms of e.g., BRSRP, BRSRQ, BSINR associated with the beams belonging to the cells within the rangeToBestCell may be logged as part of beam level measurement.

Note that R values are calculated based on the cell-ranking criterion R (i.e., $R_s$ and $R_n$), as discussed above.

A UE which is configured with Logged MDT performs the logging of the above information at each logging occasion.

In one sub embodiment, the highest ranked cell is referring to the cell which has the highest R value during the first-round ranking of the latest cell reselection evaluation before the logging occasion.

In another sub embodiment, the highest ranked cell is referring to the cell which has the highest R value during the last-round ranking of the latest cell reselection evaluation before the logging occasion.

Figure 4:
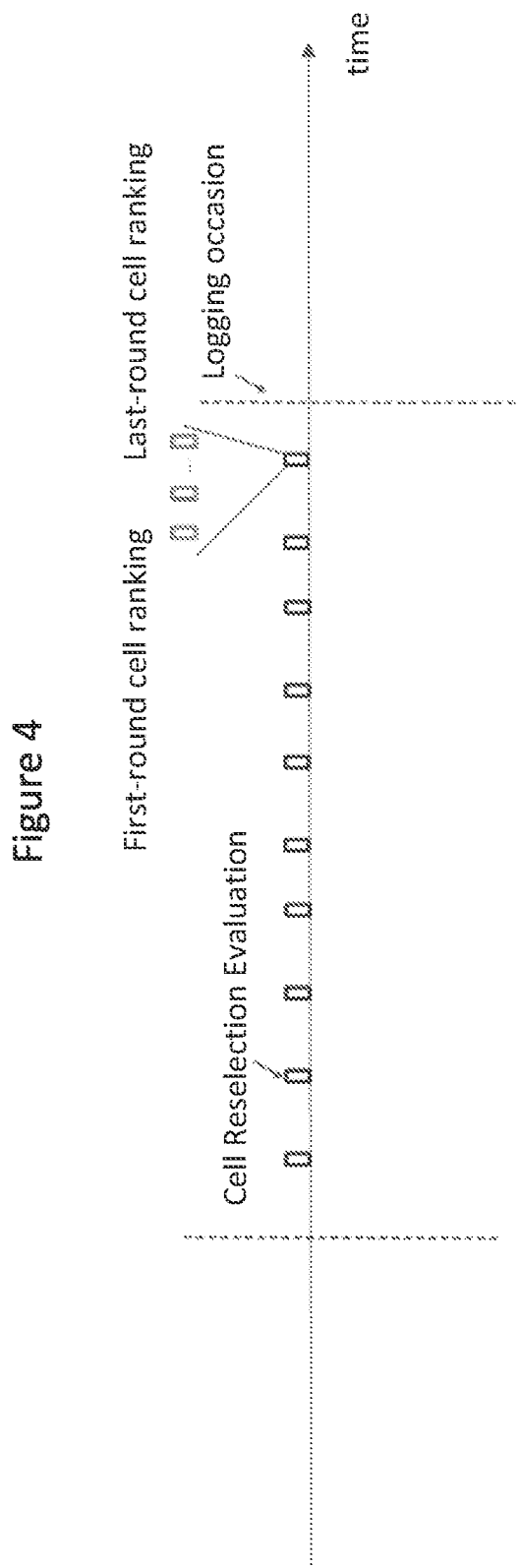
FIG. 4 is a timing diagram illustrating cell reselection evaluation occasions, cell ranking during a cell reselection occasion, and an MDT logging occasion according to some embodiments of inventive concepts.

FIG. 4 illustrates the cell reselection evaluation occasion, the cell ranking during each cell reselection occasion, and the MDT logging occasion.

According to some other embodiments of inventive concepts, as part of log MDT configuration, the network can configure the UE to log/store one of the following information for the cells within the rangeToBestCell of the RSRP value of the highest ranked cell. The "number of good beams" associated with the cells within the rangeToBestCell may be logged as part of beam level measurement. The beam indexes associated with the cells within the rangeToBest-Cells may be logged as part of beam level measurement. At least one of the beam quality measurement in terms of e.g., BRSRP, BRSRQ, BSINR associated with the beams belonging to the cells within the rangeToBestCell may be logged as part of beam level measurement.

According to still other embodiments of inventive concepts, as part of log MDT configuration, network can configure the UE to log/store one of the following information for the cells within a threshold (below, above or both) of the RSRP value of the serving cell. The "number of good beams" associated with the cells within the rangeToBestCell may be logged as part of beam level measurement. The beam indexes associated with the cells within the rangeToBest-Cells may be logged as part of beam level measurement. At least one of the beam quality measurement in terms of e.g., BRSRP, BRSRQ, BSINR associated with the beams belonging to the cells within the rangeToBestCell may be logged as part of beam level measurement.

According to yet other embodiments of inventive concepts, as part of log MDT configuration, the network can configure the UE to log/store one of the following information for the cells within a threshold (below, above or both) of the R value of the serving cell. The "number of good beams" associated with the cells within the rangeToBestCell may be logged as part of beam level measurement. The beam indexes associated with the cells within the rangeToBest-Cells may be logged as part of beam level measurement. At least one of the beam quality measurement in terms of e.g., BRSRP, BRSRQ, BSINR associated with the beams belonging to the cells within the rangeToBestCell may be logged as part of beam level measurement.

According to further embodiments of inventive concepts, as part of log MDT configuration, the network can configure the UE to log at least one of the following information for an "N number of best cells" in the ranking list (ranked based on RSRP or R value). The "number of good beams" associated with the cells within the set of N best cells in the ranking list may be logged. The "beam indexes" associated with the cells within the set of N best cells in the ranking list may be logged. At least one of the beam quality measurement in terms of e.g., BRSRP, BRSRQ, BSINR associated with the beams belonging to the cells within the set of N best cells in the ranking list may be logged.

According to more embodiments of inventive concepts, the 'number of good beams' (or any above-mentioned information to be logged), is logged as part of the logged MDT only when there is at least one other cell within the 'rangeToBestCell' of the strongest cell. In some other embodiments, the 'number of good beams' is logged as part of the logged MDT at every logging interval.

In some sub-embodiments, only the actual number of good beams from these cells is included in the logged MDT.

Some embodiments of inventive concepts may thus provide beam measurement logging in logged MDT.

Operations of the wireless device 900 (implemented using the structure of the block diagram of FIG. 5) will now be discussed with reference to the flow chart of FIG. 8 according to some embodiments of inventive concepts. For example, modules may be stored in memory 905 of FIG. 5, and these modules may provide instructions so that when the instructions of a module are executed by respective wireless device processing circuitry 903, processing circuitry 903 performs respective operations of the flow chart.

At block 1201, processing circuitry 903 may receive (through transceiver 901) a MDT configuration from the wireless communication network, wherein the MDT configuration specifies logging the measurement information including cell identity and beam information at MDT logging occasions.

At block 1205, processing circuitry 903 may determine if a cell reselection evaluation shall occur. Responsive to determining that a cell reselection evaluation shall occur, processing circuitry 903 may determine respective signal qualities of a plurality of cells of the wireless communication network at block 1209, and rank the plurality of cells based on the respective signal qualities of the plurality of cells at block 1215. As shown in FIG. 4, multiple cell reselection evaluations may occur over a single MDT logging interval, in which case, information from the most recent cell reselection evaluation may be used for an MDT logging occasion.

Figure 1:
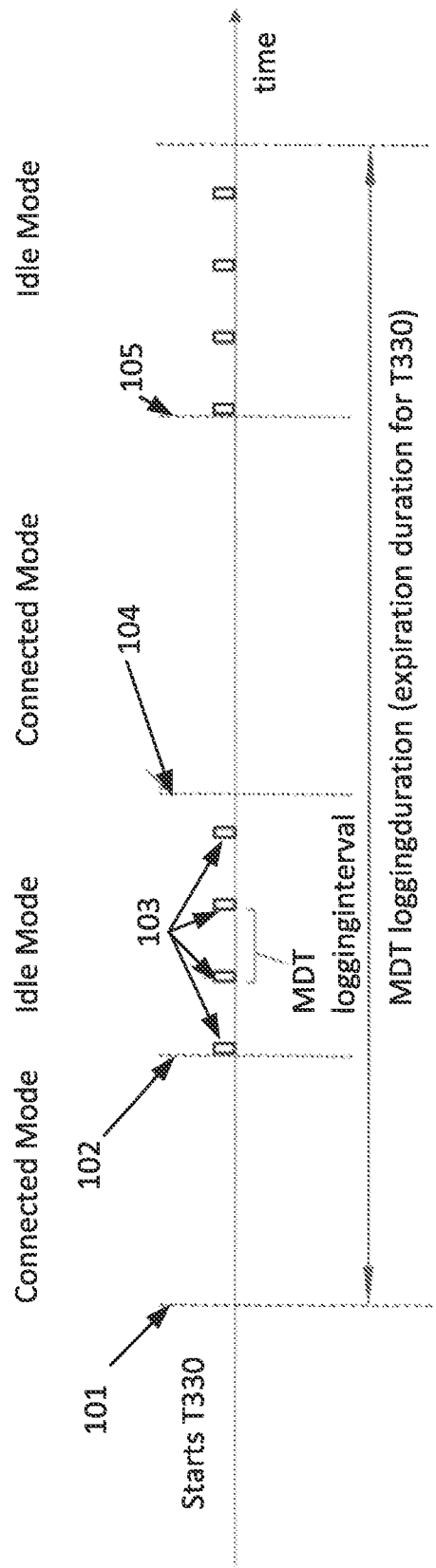
FIG. 1 is a diagram illustrating a logged MDT procedure.
Figure 2:
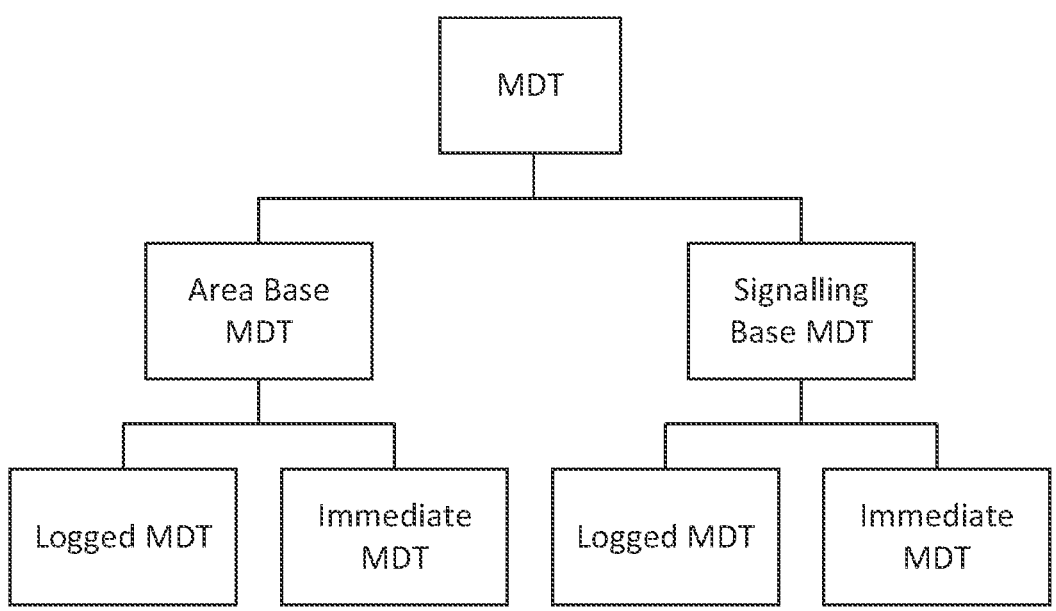
FIG. 2 is a diagram illustrating a summary of MDT classification.
Figure 3:
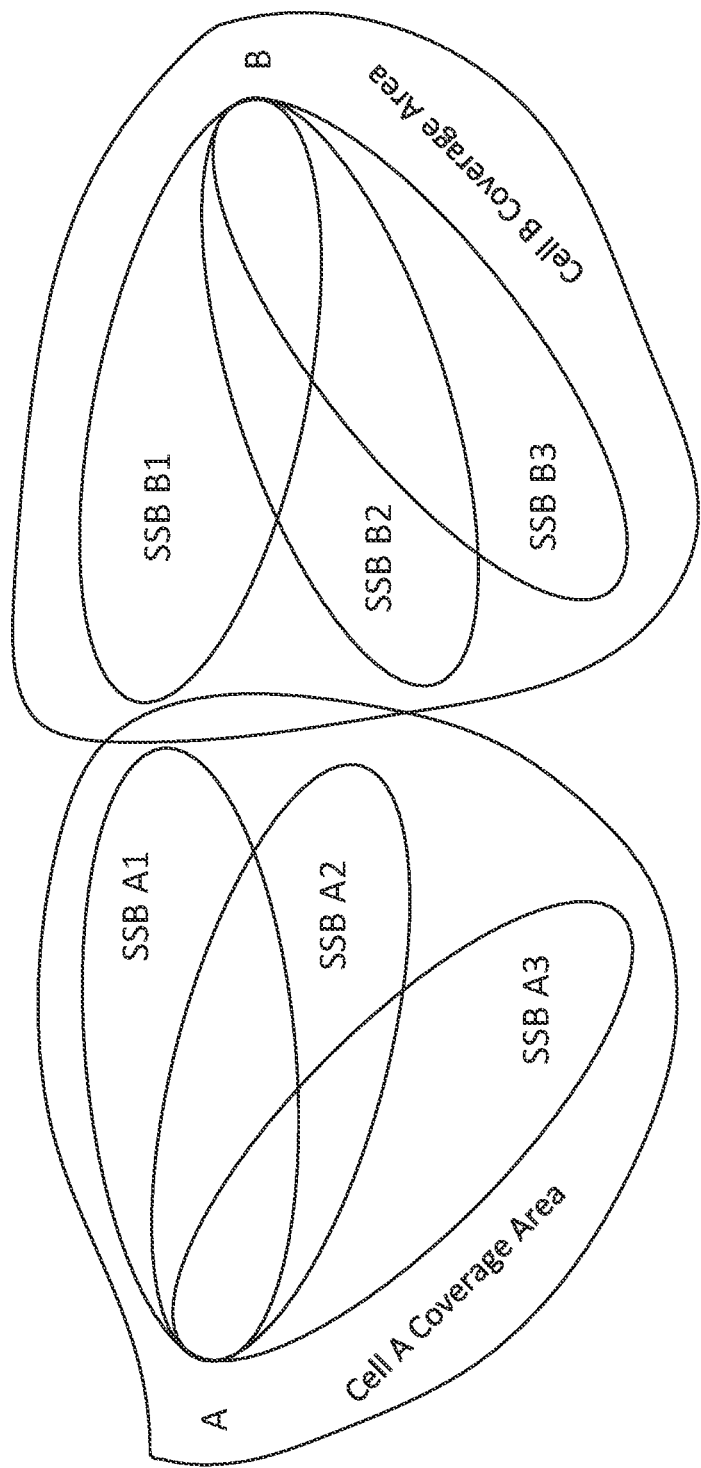
FIG. 3 illustrates cell coverage areas based on SSB beams.

At block 1219, processing circuitry 903 may determine if a MDT logging occasion shall occur. As shown in FIG. 1, MDT logging may occur periodically (e.g., based on an MDT logging interval). Responsive to determining that a MDT logging occasion shall occur, processing circuitry 903 may log measurement information for at least one of the plurality of cells in memory 905 of the wireless device at block 1225 based on ranking the plurality of cells, wherein the measurement information includes a cell identity and beam information for the at least one of the plurality of cells. Logging at block 1225 may include logging the measurement information with RSRP and/or RSRQ for the MDT logging occasion. Multiple MDT logging occasions may occur before transmitting a MDT report so that a MDT report may include information from multiple MDT logging occasions.

At block 1235, processing circuitry 903 may determine if a MDT report should be transmitted. Responsive to determining that a MDT report should be transmitted, processing circuitry 903 may transmit (through transceiver 901) at block 1239 a MDT report to the wireless communication network including the measurement information from the logged MDT information of block 1225 for the MDT logging occasions associated with the MDT report.

Figure 8:
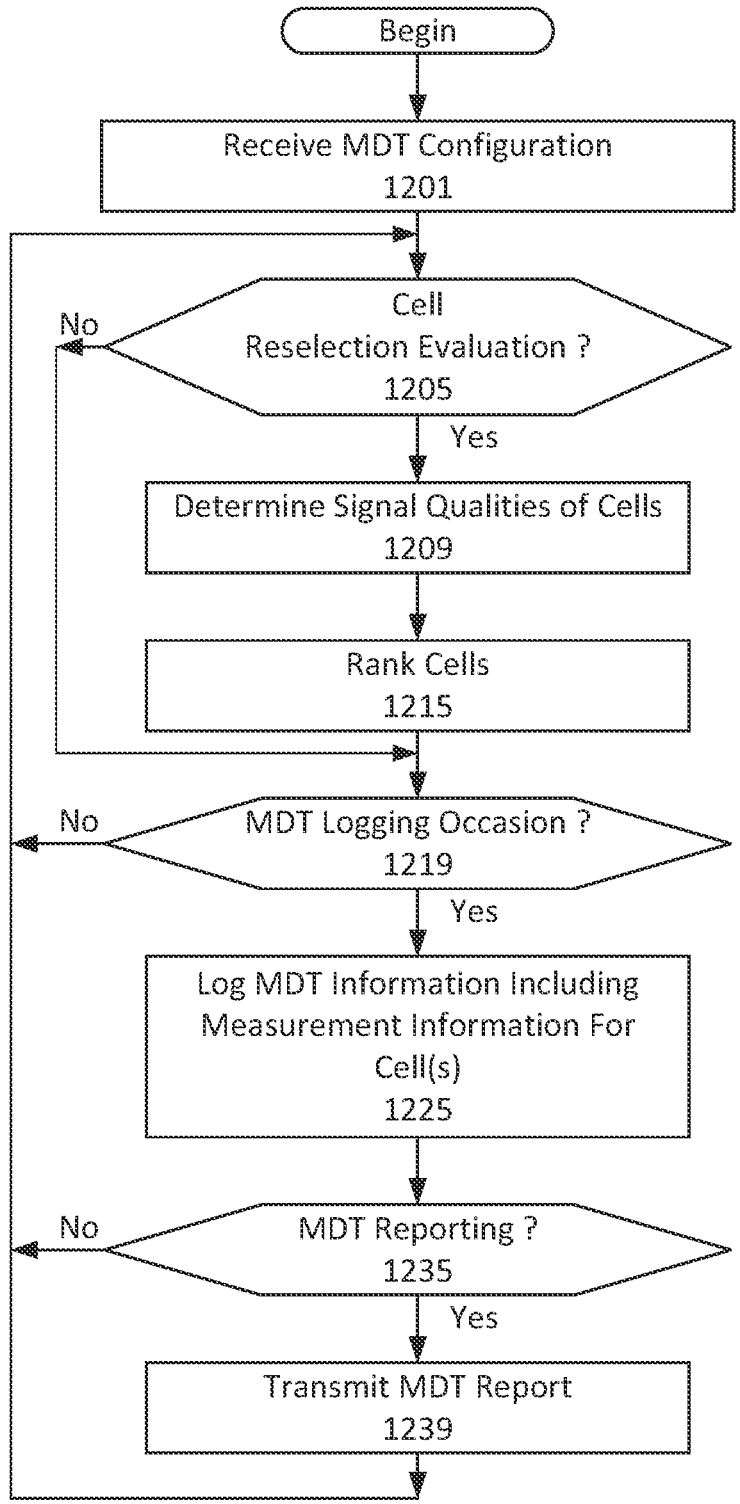
FIG. 8 is a flow chart illustrating operations of a wireless device according to some embodiments of inventive concepts.

Various operations from the flow chart of FIG. 8 may be optional with respect to some embodiments of wireless devices and related methods. Regarding methods of example embodiment 1 (set forth below), for example, operations of blocks 1201, 1205, 1219, and 1235 of FIG. 8 may be optional.

Example Embodiments are Discussed Below

1. A method of operating a wireless device in a wireless communication network, the method comprising: determining (1209) respective signal qualities of a plurality of cells of the wireless communication network; ranking (1215) the plurality of cells based on the respective signal qualities of the plurality of cells; logging (1225) measurement information for at least one of the plurality of cells in memory of the wireless device based on ranking the plurality of cells, wherein the measurement information includes a cell identity and beam information for the at least one of the plurality of cells; and transmitting (1239) a report to the wireless communication network, wherein the report includes the measurement information.

2. The method of Embodiment 1, wherein logging the measurement information comprises logging measurement information for first and second cells, wherein the measurement information includes a cell identity of the first cell, a number of beams of the first cell exceeding a quality threshold, a cell identity of the second cell, and a number of beams of the second cell exceeding the quality threshold.

3. The method of Embodiment 1, wherein logging the measurement information comprises logging measurement information for first and second cells, wherein the measurement information includes a cell identity of the first cell, cell indices of beams of the first cell exceeding a quality threshold, a cell identity of the second cell, and cell indices of beams of the second cell exceeding the quality threshold.

4. The method of Embodiment 3, wherein the measurement information further includes at least one of a beam reference signal received power, BRSRP, a beam reference signal received quality, BRSRQ, and/or a beam signal to interference and noise ratio, BSINR, for each of the beams of the first and second cells exceeding the quality threshold.

5. The method of any of Embodiments 1-4, wherein ranking comprises identifying a first one of the plurality of cells having a highest signal quality and identifying at least a second one of the plurality of cells having a signal quality within a defined range of the highest signal quality, and wherein the measurement information includes a respective cell identity and beam information for each of the first one of the plurality of the cells and the second one of the plurality of cells.

6. The method of any of Embodiments 1-4, wherein ranking comprises identifying a serving cell of the plurality of cells, determining a signal quality of the serving cell, determining a threshold based on the signal quality of the serving cell, and identifying at least one neighbor cell of the plurality of cells having a respective signal quality greater than the threshold, and wherein the measurement information includes a respective cell identity and beam information for each of the serving cell and the at least one neighbor cell having the respective signal quality greater than the threshold.

7. The method of any of Embodiments 1-4, wherein ranking comprises identifying a defined number N of the plurality of cells having the N highest signal qualities of the plurality of cells, and wherein the measurement information includes a respective cell identity and beam information for each of the N cells of the plurality of cells.

8. The method of any of Embodiments 1-7, wherein the respective signals qualities are determined based on measurements of respective reference signals received from the cells.

9. The method of any of Embodiments 1-8, wherein the respective signal qualities of the plurality of cells comprise at least one of respective reference signal received powers, RSRPs, of the plurality of cells, respective reference signal received qualities, RSRQs, of the plurality of cells, respective signal to interference and noise ratios, SINRs, of the plurality of cells, and/or respective R-values of the plurality of cells.

10. The method of any of Embodiments 1-9, wherein determining comprises performing a cell reselection evaluation procedure to determine the respective signal qualities of the plurality of cells.

11. The method of any of Embodiments 1-10, wherein logging the measurement information comprises logging the measurement information at a minimizing drive test, MDT, logging occasion after determining the respective signal qualities.

12. The method of Embodiment 11, wherein the MDT logging occasion is a first MDT logging occasion, the method further comprising: logging (1225) at least one of a first reference signal received power, RSRP, and/or a first reference signal received quality, RSRQ, for the first MDT logging occasion; and logging (1239) at least one of a second RSRP and/or a second RSRQ for a second MDT logging occasion different than the first MDT logging occasion; wherein the report includes the measurement information for the first MDT logging occasion, the at least one of the first RSRP and/or the first RSRQ for the first MDT logging occasion, and the at least one of the second RSRP and/or the second RSRQ for the second MDT logging occasion.

13. The method of any of Embodiments 10-12 further comprising: receiving (1201) a MDT configuration from the wireless communication network, wherein the MDT configuration specifies logging the measurement information including the cell identity and beam information at the MDT logging occasion.

14. The method of any of Embodiments 1-13, wherein determining the respective signal qualities comprises determining a respective signal quality of each cell of the plurality of cells based on a signal quality of one beam of the respective cell.

15. The method of any of Embodiments 1-13, wherein determining the respective signal qualities comprises determining a respective signal quality of each cell of the plurality of cells based on an average of signal qualities of a plurality of beams of the respective cell.

16. A wireless device (900) configured to operate in a communication network, the wireless device comprising: processing circuitry (903); and memory (905) coupled with the processing circuitry, wherein the memory includes instructions that when executed by the processing circuitry causes the wireless device to perform operations according to any of Embodiments 1-15.

17. A wireless device (900) configured to operate in a communication network, wherein the wireless device is adapted to perform according to any of Embodiments 1-15.

18. A computer program comprising program code to be executed by processing circuitry (903) of a wireless device (900) configured to operate in a communication network, whereby execution of the program code causes the wireless device (900) to perform operations according to any of embodiments 1-15.

19. A computer program product comprising a non-transitory storage medium including program code to be executed by processing circuitry (903) of a wireless device (900) configured to operate in a communication network, whereby execution of the program code causes the wireless device (900) to perform operations according to any of embodiments 1-15.

Explanations are provided below for various abbreviations/acronyms used in the present disclosure.

Abbreviation Explanation
3GPP 3rd Generation Partnership Project
5G 5th Generation
5GC 5G Core network
AMF Access and Mobility management Function
AS Access Stratum
BRSRP Beam level RSRP
BRSRQ Beam level RSRQ
BSINR Beam level SINR
CE Control Element
CFRA Contention Free Random Access
CHO Conditional Handover
CN Core Network
C-RNTI Cell Radio Network Temporary Identifier
CSI-RS Channel State Information Reference Signal
dB decibel
DC Dual Connectivity
DL Downlink
eNB eNodeB
eNodeB Evolved NodeB
EPC Evolved Packet Core
EUTRA Evolved Universal Terrestrial Radio Access/E-UTRA
EUTRAN Evolved Universal Terrestrial Radio Access Network/E-UTRAN
FFS For Further Study
gNB/gNodeB A radio base station in NR.
GPRS General Packet Radio Service
GTP GPRS Tunneling Protocol
HO Handover
IE Information Element
IMEI International Mobile Equipment Identity
IMSI International Mobile Subscriber Identity
LTE Long Term Evolution
MAC Medium Access Control
MAC CE MAC Control Element
MCG Master Cell Group
MDT Minimization of drive tests
MME Mobility Management Entity
MSG Message NAS Non-access Stratum
NG The interface/reference point between NG-RAN and 5GC.
NGAP NG Application Protocol/Next Generation Application Protocol
NG-RAN Next Generation Radio Access Network
NR New Radio
PCell Primary Cell (i.e. the primary cell of a MCG)
PLMN Public Land Mobile Network
PSCell Primary Secondary Cell (i.e. the primary cell of a SCG)
QoS Quality of Service
RA Random Access
RAR Random Access Response
RACH Random Access Channel
RAN Radio Access Network
RAT Radio Access Technology
RLF Radio Link Failure
RRC Radio Resource Control
RRM Radio Resource Management
RS Reference Signal
RSRP Reference Signal Received Power
RSRQ Reference Signal Received Quality
S1 The interface/reference point between E-UTRAN and EPC.
SCell Secondary Cell
SCG Secondary Cell Group
SINR Signal to Interference and Noise Ratio
SpCell Special Cell, i.e. either a PCell or a PSCell.
SN Sequence Number
SRB Signaling Radio Bearer
SSB Synchronization Signal Block
TS Technical Specification
UE User Equipment
UP User Plane
UPF User Plane Function
Uu The interface/reference point between a gNB/eNB and a UE, i.e. the radio interface.
WLAN Wireless Local Area Network
X2 The interface/reference point between two eNBs.
X2AP X2 Application Protocol
Xn The interface/reference point between two gNBs.
Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 9:
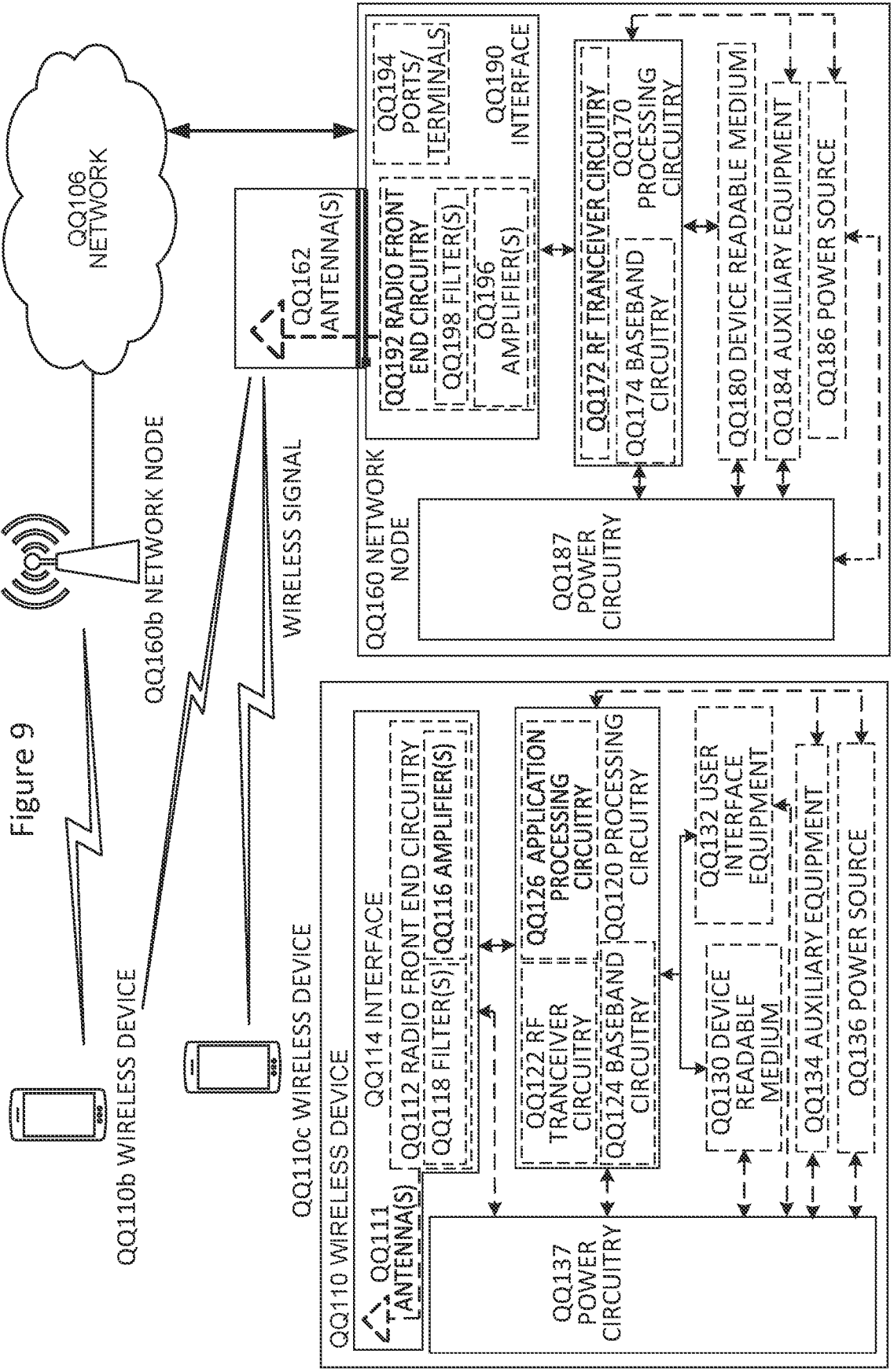
FIG. 9 is a block diagram of a wireless network in accordance with some embodiments.

FIG. 9 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 9 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). A vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 10:
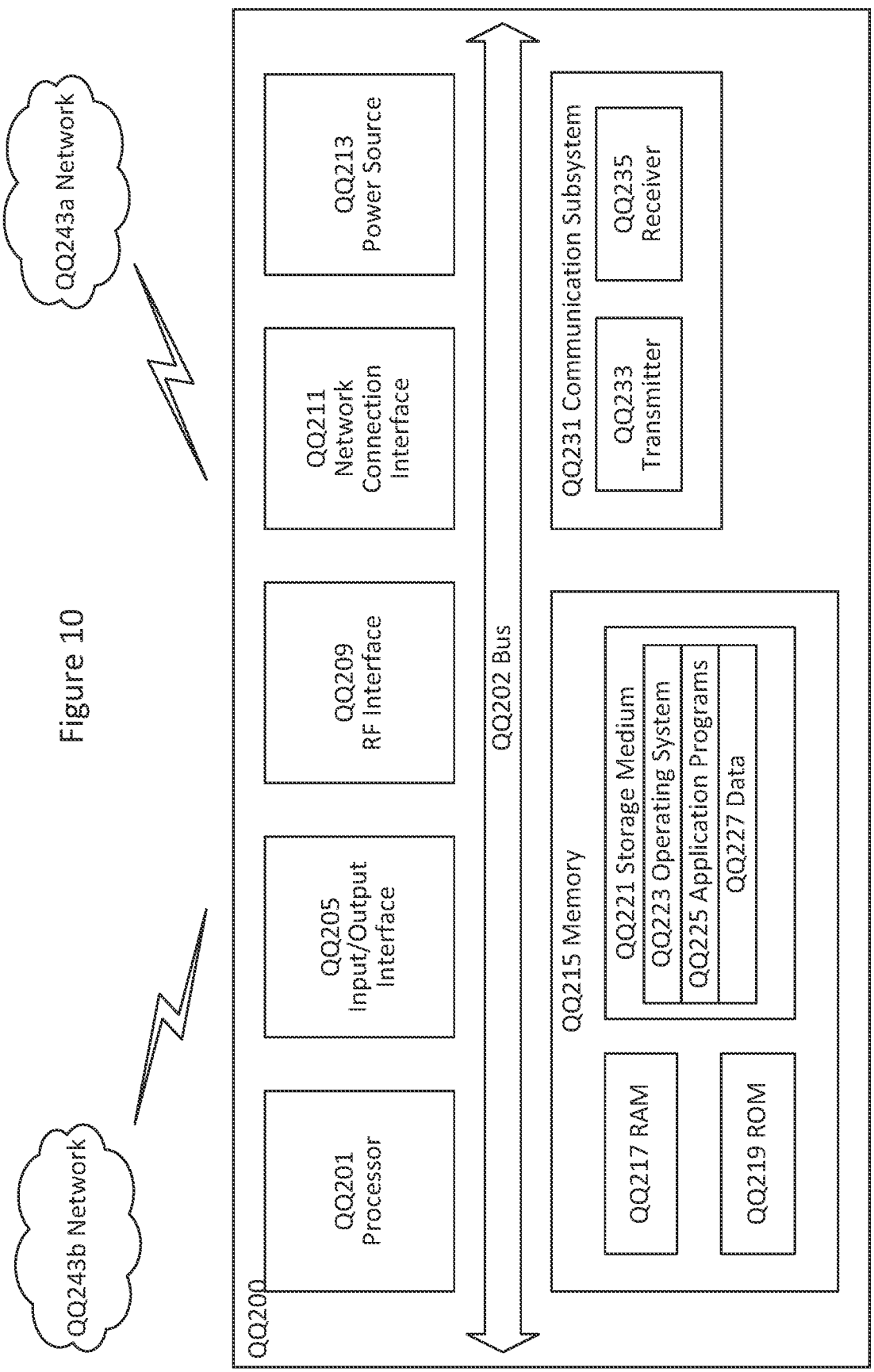
FIG. 10 is a block diagram of a user equipment in accordance with some embodiments

FIG. 10 illustrates a user Equipment in accordance with some embodiments.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 10, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 10, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 11:
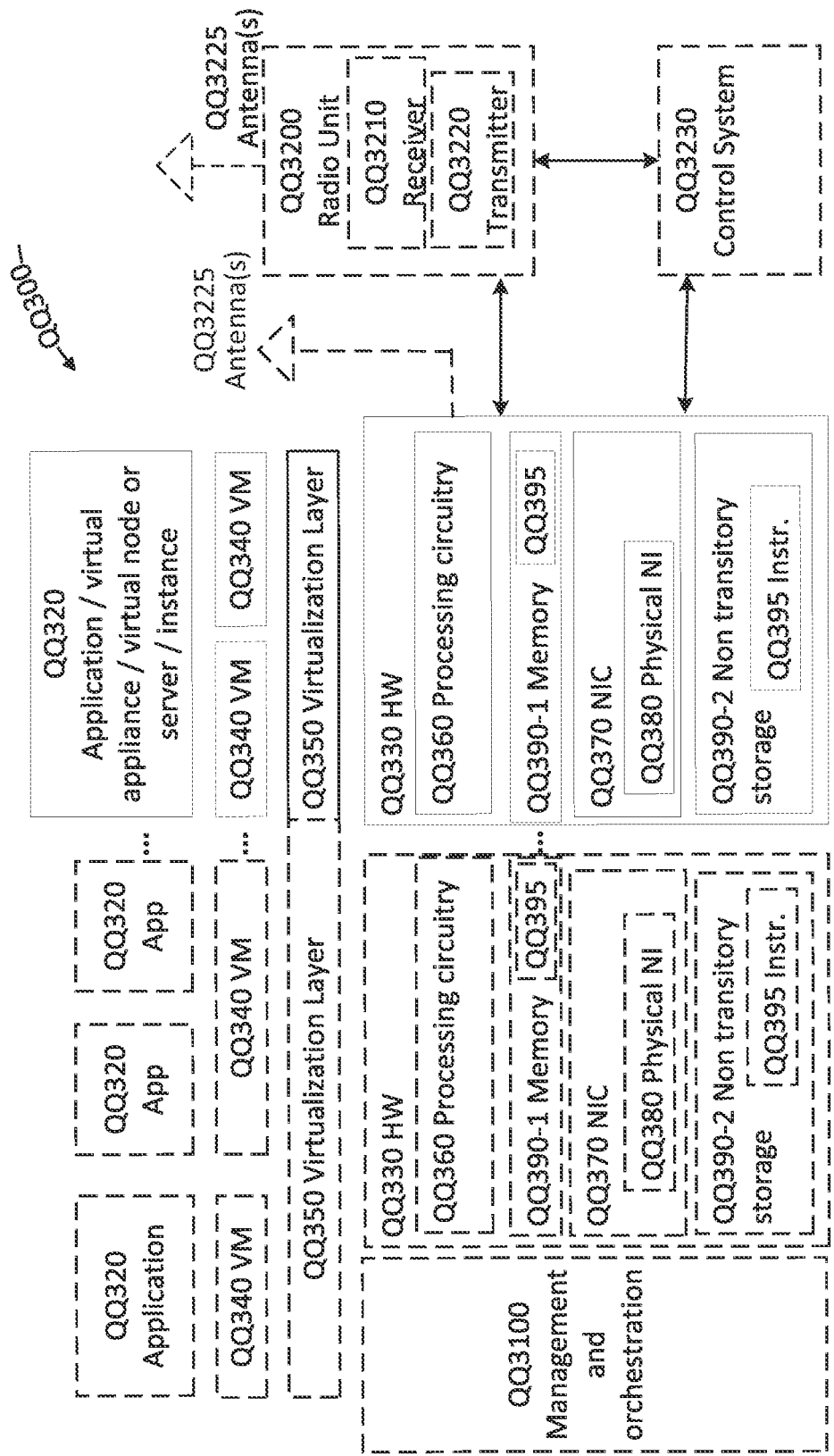
FIG. 11 is a block diagram of a virtualization environment in accordance with some embodiments.

FIG. 11 illustrates a virtualization environment in accordance with some embodiments.

FIG. 11 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 11, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 11.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 12:
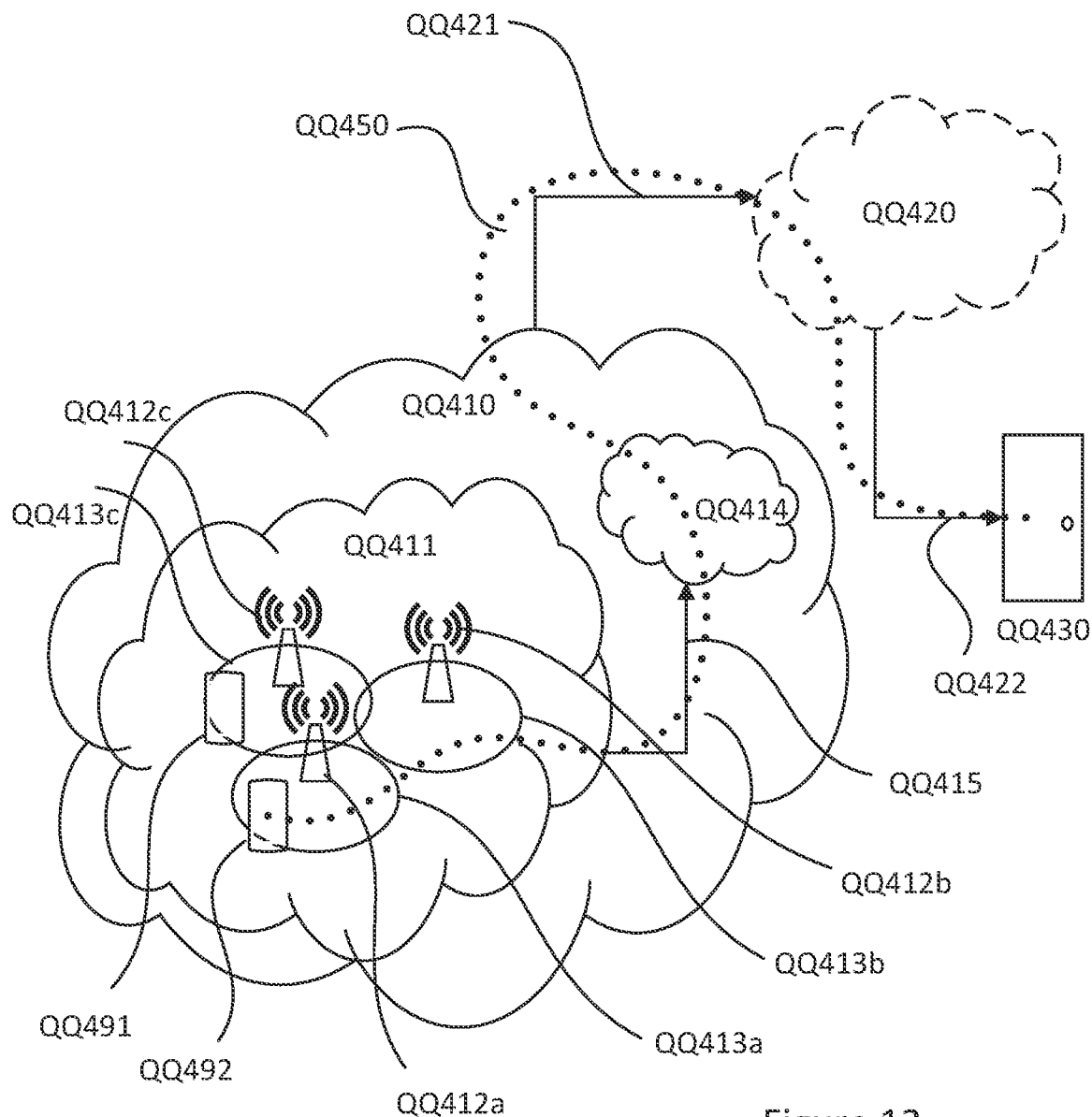
FIG. 12 is a block diagram of a telecommunication network connected via an intermediate network to a host computer in accordance with some embodiments.

FIG. 12 illustrates a telecommunication network connected via an intermediate network to a host computer in accordance with some embodiments.

With reference to FIG. 12, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 12 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 13:
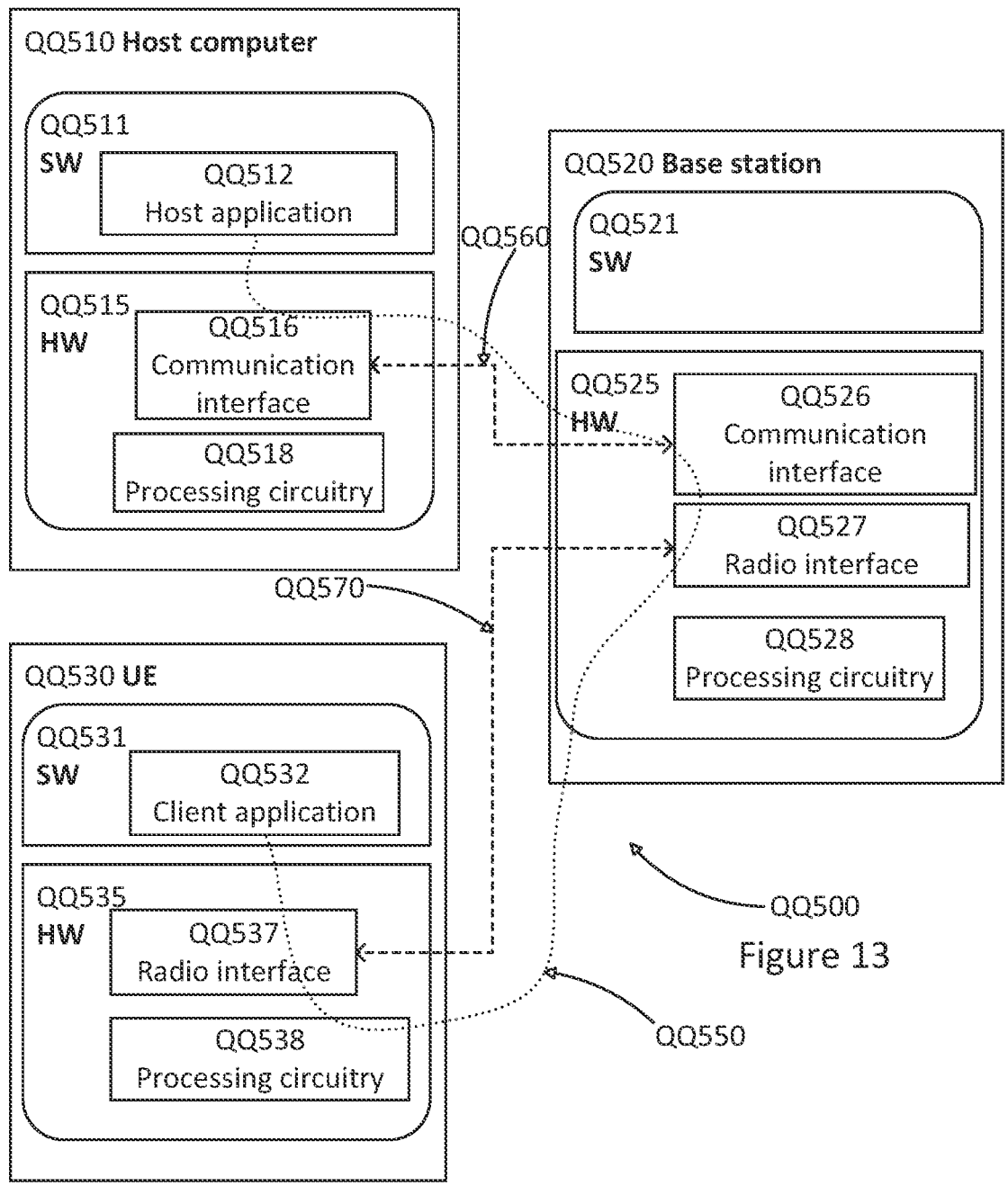
FIG. 13 is a block diagram of a host computer communicating via a base station with a user equipment over a partially wireless connection in accordance with some embodiments.

FIG. 13 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 13. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 13) served by base station QQ520. Communication interface QQ526 may be configured to facilitate connection QQ560 to host computer QQ510. Connection QQ560 may be direct or it may pass through a core network (not shown in FIG. 13) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 13 may be similar or identical to host computer QQ430, one of base stations QQ412a, QQ412b, QQ412c and one of UEs QQ491, QQ492 of FIG. 12, respectively. This is to say, the inner workings of these entities may be as shown in FIG. 13 and independently, the surrounding network topology may be that of FIG. 12.

In FIG. 13, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 14:
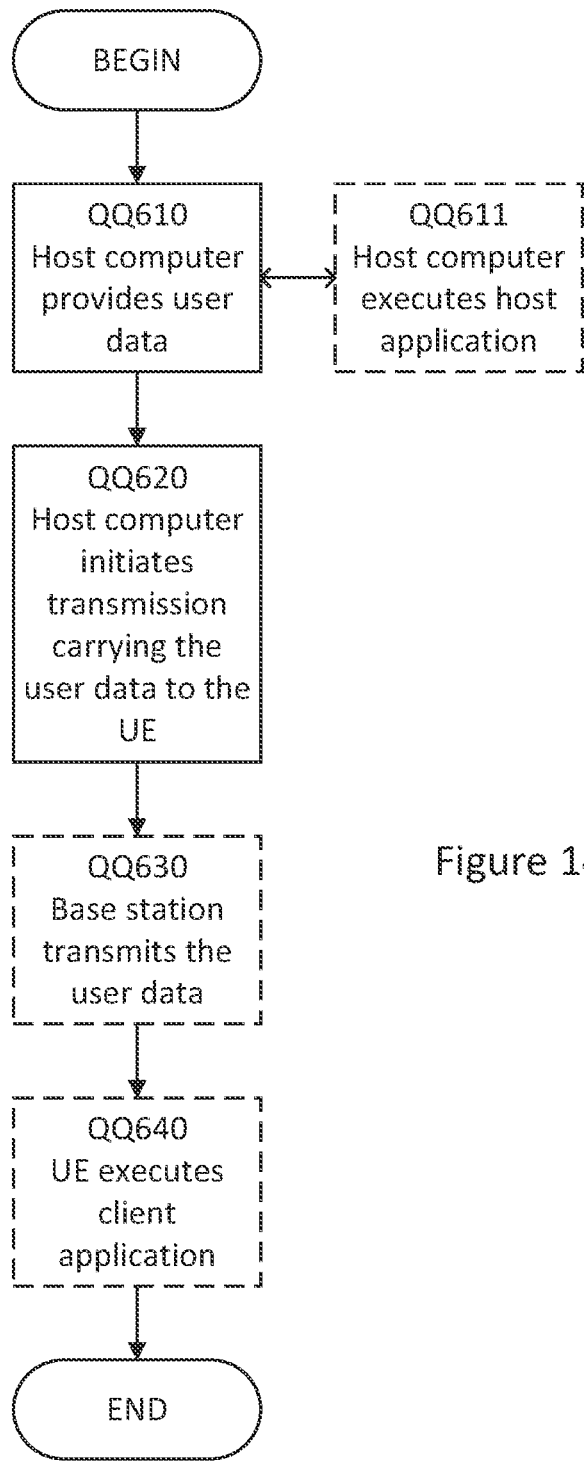
FIG. 14 is a flow chart of methods implemented in a communication system including a host computer, a base station and a user equipment in accordance with some embodiments.

FIG. 14 illustrates methods implemented in a communication system including a host computer, a base station and a user equipment in accordance with some embodiments FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 15:
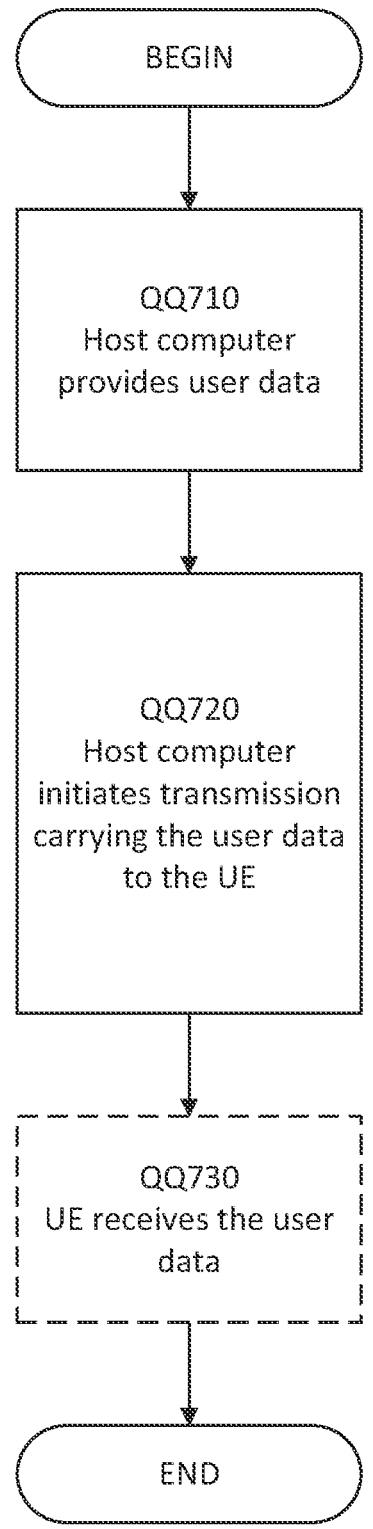
FIG. 15 is a flow chart of methods implemented in a communication system including a host computer, a base station and a user equipment in accordance with some embodiments.

FIG. 15 illustrates methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 16:
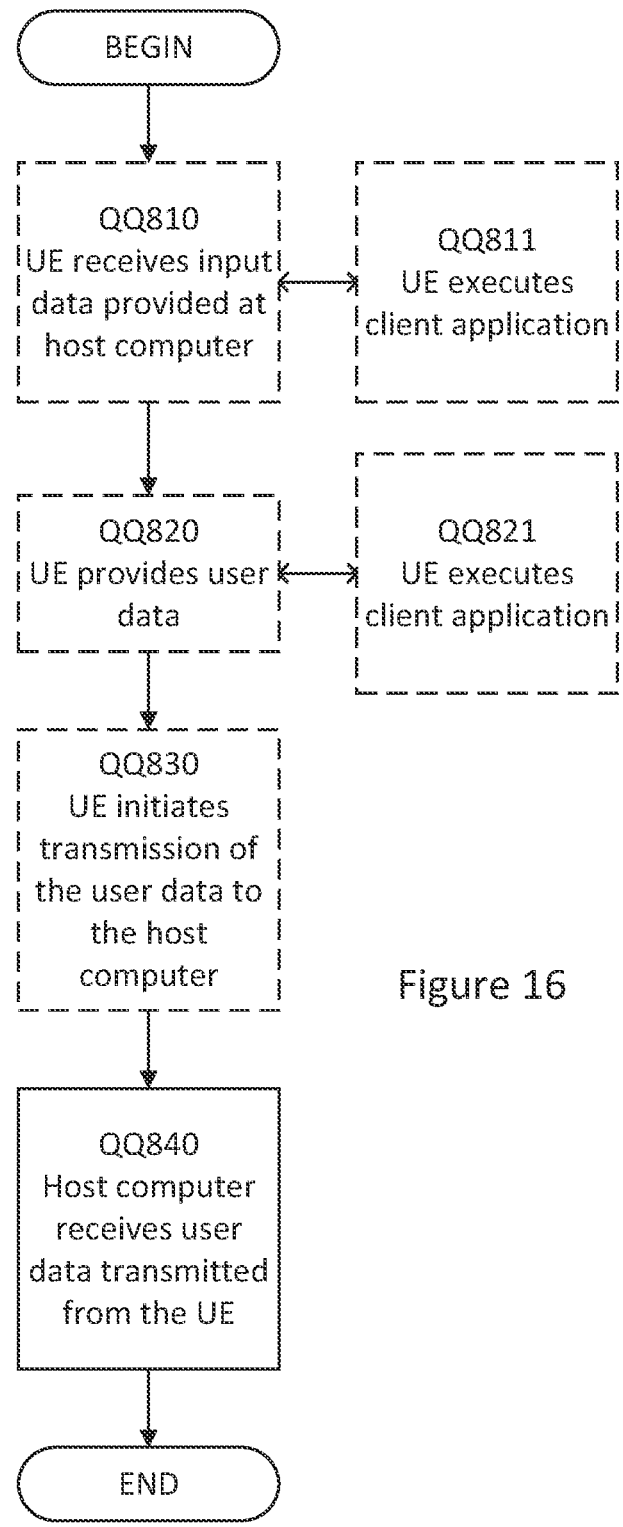
FIG. 16 is a flow chart of methods implemented in a communication system including a host computer, a base station and a user equipment in accordance with some embodiments.

FIG. 16 illustrates methods implemented in a communication system including a host computer, a base station and a user equipment in accordance with some embodiments FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 17:
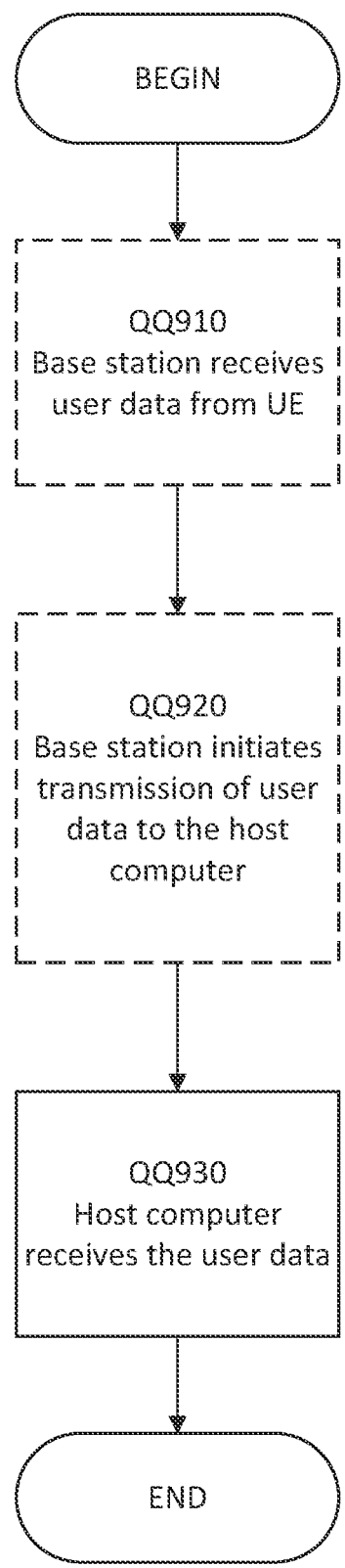
FIG. 17 is a flow chart of methods implemented in a communication system including a host computer, a base station and a user equipment in accordance with some embodiments.

FIG. 17 illustrates methods implemented in a communication system including a host computer, a base station and a user equipment in accordance with some embodiments FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeal Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast sendee Single Frequency Network MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated as "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a wireless device in a wireless communication network, the method comprising:

determining respective signal qualities of a plurality of cells of the wireless communication network;

counting a number of beams of a first cell of the plurality of cells determined to have signal qualities that exceed a quality threshold, to generate a first count value;

counting a number of beams of a second cell of the plurality of cells determined to have signal qualities that exceed a quality threshold, to generate a second count value;

ranking the plurality of cells based on the respective signal qualities of the plurality of cells, wherein ranking comprises identifying the first cell of the plurality of cells having a highest signal quality and identifying at least the second cell of the plurality of cells having a signal quality within a defined range of the highest signal quality;

logging measurement information for at least one of the plurality of cells in memory of the wireless device based on ranking the plurality of cells, wherein the measurement information includes a cell identity and beam information for the at least one of the plurality of cells;

generating a report including separate fields storing a cell identity for the first cell, the first count value, a cell identity for the second cell, and the second count value, wherein the cell identity for the second cell and the second count value are included in the report only if the second cell of the plurality of cells has a signal quality within the defined range of the highest signal quality; and transmitting to the wireless communication network the report including the fields storing the cell identity for the first cell, the first count value, the cell identity for the second cell, and the second count value.

2. The method of claim 1, wherein the measurement information includes cell indices of beams of the first cell exceeding a quality threshold, and cell indices of beams of the second cell exceeding the quality threshold.

3. The method of claim 2, wherein the measurement information further includes at least one of a beam reference signal received power, BRSRP, a beam reference signal received quality, BRSRQ, and/or a beam signal to interference and noise ratio, BSINR, for each of the beams of the first and second cells exceeding the quality threshold.

4. The method of claim 1, wherein ranking comprises identifying a serving cell of the plurality of cells, determining a signal quality of the serving cell, determining a threshold based on the signal quality of the serving cell, and identifying at least one neighbor cell of the plurality of cells having a respective signal quality greater than the threshold, and wherein the measurement information includes a respective cell identity and beam information for each of the serving cell and the at least one neighbor cell having the respective signal quality greater than the threshold.

5. The method of claim 1, wherein ranking comprises identifying a defined number N of the plurality of cells having the N highest signal qualities of the plurality of cells, and wherein the measurement information includes a respective cell identity and beam information for each of the N cells of the plurality of cells.

6. The method of claim 1, wherein the respective signals qualities are determined based on measurements of respective reference signals received from the cells.

7. The method of claim 1, wherein the respective signal qualities of the plurality of cells comprise at least one of respective reference signal received powers, RSRPs, of the plurality of cells, respective reference signal received qualities, RSRQs, of the plurality of cells, respective signal to interference and noise ratios, SINRs, of the plurality of cells, and/or respective R-values of the plurality of cells.

8. The method of claim 1, wherein determining comprises performing a cell reselection evaluation procedure to determine the respective signal qualities of the plurality of cells.

9. The method of claim 1, wherein logging the measurement information comprises logging the measurement information at a minimizing drive test, MDT, logging occasion after determining the respective signal qualities.

10. The method of claim 9, wherein the MDT logging occasion is a first MDT logging occasion, the method further comprising:
   logging at least one of a first reference signal received power, RSRP, and/or a first reference signal received quality, RSRQ, for the first MDT logging occasion; and
   logging at least one of a second RSRP and/or a second RSRQ for a second MDT logging occasion different than the first MDT logging occasion;
   wherein the report includes the measurement information for the first MDT logging occasion, the at least one of the first RSRP and/or the first RSRQ for the first MDT logging occasion, and the at least one of the second RSRP and/or the second RSRQ for the second MDT logging occasion.

11. A wireless device adapted to perform according to claim 1.

12. A computer program product comprising a non-transitory storage medium including program code to be executed by processing circuitry of a wireless device, whereby execution of the program code causes the wireless device to perform operations according to claim 1.

13. A wireless device comprising:
   processing circuitry; and
   memory coupled with the processing circuitry, wherein the memory includes instructions that when executed by the processing circuitry causes the wireless device to
      determine respective signal qualities of a plurality of cells of a wireless communication network,
      count a number of beams of a first cell of the plurality of cells determined to have signal qualities that exceed a quality threshold, to generate a first count value;
      count a number of beams of a second cell of the plurality of cells determined to have signal qualities that exceed a quality threshold, to generate a second count value;
      rank the plurality of cells based on the respective signal qualities of the plurality of cells, wherein ranking comprises identifying the first cell of the plurality of cells having a highest signal quality and identifying at least the second cell of the plurality of cells having a signal quality within a defined range of the highest signal quality,
      log measurement information for at least one of the plurality of cells in memory of the wireless device based on ranking the plurality of cells, wherein the measurement information includes a cell identity and beam information for the at least one of the plurality of cells,
      generate a report including separate fields storing a cell identity for the first cell, the first count value, a cell identity for the second cell, and the second count value, wherein the cell identity for the second cell and the second count value are included in the report only if the second cell of the plurality of cells has a signal quality within the defined range of the highest signal quality; and
      transmit to the wireless communication network the report including the fields storing the cell identity for the first cell, the first count value, the cell identity for the second cell, and the second count value.

14. The wireless device of claim 13, wherein the measurement information includes cell indices of beams of the first cell exceeding a quality threshold, and cell indices of beams of the second cell exceeding the quality threshold.

15. The wireless device of claim 14, wherein the measurement information further includes at least one of a beam reference signal received power, BRSRP, a beam reference signal received quality, BRSRQ, and/or a beam signal to interference and noise ratio, BSINR, for each of the beams of the first and second cells exceeding the quality threshold.

16. The wireless device of claim 13, wherein ranking comprises identifying a serving cell of the plurality of cells, determining a signal quality of the serving cell, determining a threshold based on the signal quality of the serving cell, and identifying at least one neighbor cell of the plurality of cells having a respective signal quality greater than the threshold, and wherein the measurement information includes a respective cell identity and beam information for each of the serving cell and the at least one neighbor cell having the respective signal quality greater than the threshold.

17. The wireless device of claim 13, wherein ranking comprises identifying a defined number N of the plurality of cells having the N highest signal qualities of the plurality of cells, and wherein the measurement information includes a respective cell identity and beam information for each of the N cells of the plurality of cells.

18. The wireless device of claim 13, wherein the respective signals qualities are determined based on measurements of respective reference signals received from the cells.

19. The wireless device of claim 13, wherein the respective signal qualities of the plurality of cells comprise at least one of respective reference signal received powers, RSRPs, of the plurality of cells, respective reference signal received qualities, RSRQs, of the plurality of cells, respective signal to interference and noise ratios, SINRs, of the plurality of cells, and/or respective R-values of the plurality of cells.

20. The wireless device of claim 13, wherein determining comprises performing a cell reselection evaluation procedure to determine the respective signal qualities of the plurality of cells.

21. The wireless device of claim 13, wherein logging the measurement information comprises logging the measurement information at a minimizing drive test, MDT, logging occasion after determining the respective signal qualities.

22. The wireless device of claim 21, wherein the MDT logging occasion is a first MDT logging occasion, wherein the memory further includes instructions that when executed by the processing circuitry causes the wireless device to,
   log at least one of a first reference signal received power, RSRP, and/or a first reference signal received quality, RSRQ, for the first MDT logging occasion; and
   log at least one of a second RSRP and/or a second RSRQ for a second MDT logging occasion different than the first MDT logging occasion;
   wherein the report includes the measurement information for the first MDT logging occasion, the at least one of the first RSRP and/or the first RSRQ for the first MDT logging occasion, and the at least one of the second RSRP and/or the second RSRQ for the second MDT logging occasion.

\* \* \* \* \*

UNITED STATES PATENT AND TRADEMARK OFFICE
CERTIFICATE OF CORRECTION

PATENT NO. : 12,010,569 B2
APPLICATION NO. : 17/441747
DATED : June 11, 2024
INVENTOR(S) : Parichehrehteroujeni et al.

It is certified that error appears in the above-identified patent and that said Letters Patent is hereby corrected as shown below:

In the Specification

In Column 2, Line 20, delete "(1.28 s·61.44 s)" and insert -- (1.28 s - 61.44 s) --, therefor.

In Column 4, Line 12, delete "manner" and insert -- manner. --, therefor.

In Column 4, Line 26, delete "manner" and insert -- manner. --, therefor.

In Column 6, Line 13, delete "and or" and insert -- and/or --, therefor.

In Column 6, Line 60, delete "TreselectionR$_{AT}$;" and insert -- Treselection$_{RAT}$; --, therefor.

In Column 6, Line 67, delete "rangeToBestCell in" and insert -- rangeToBestCell --, therefor.

In Column 7, Line 4, delete "which" and insert -- in which --, therefor.

In Column 8, Line 2, delete "embodiments" and insert -- embodiments; --, therefor.

In Column 11, Line 2, delete "RAN2 #105" and insert -- RAN2#105 --, therefor.

In Column 11, Line 22, delete "PPS:" and insert -- FFS: --, therefor.

In Column 11, Line 26, delete "studies." and insert -- studied. --, therefor.

In Column 11, Line 27, delete "RAN2 #105bis" and insert -- RAN2#105bis --, therefor.

In Column 11, Line 29, delete "as" and insert -- is --, therefor.

In Column 11, Line 32, delete "as" and insert -- is --, therefor.

Signed and Sealed this
Eighteenth Day of February, 2025

Coke Morgan Stewart
*Acting Director of the United States Patent and Trademark Office*

CERTIFICATE OF CORRECTION (continued)
U.S. Pat. No. 12,010,569 B2

In Column 14, Line 25, delete "Below" and insert -- Below. --, therefor.

In Column 20, Line 44, delete "units" and insert -- units. --, therefor.

In Column 20, Line 54, delete "manner" and insert -- manner. --, therefor.

In Column 21, Line 62, delete "circuitry QQ190" and insert -- circuitry QQ192 --, therefor.

In Column 23, Line 12, delete "(CPE). A" and insert -- (CPE), a --, therefor.

In Column 23, Line 30, delete "etc.)" and insert -- etc.), --, therefor.

In Column 23, Line 67, delete "circuitry QQ114" and insert -- circuitry QQ112 --, therefor.

In Column 25, Line 6, delete "manner" and insert -- manner. --, therefor.

In Column 26, Line 51, delete "UE QQ2200" and insert -- UE QQ200 --, therefor.

In Column 26, Line 60, delete "interchangeable." and insert -- interchangeably. --, therefor.

In Column 27, Line 2, delete "source QQ233," and insert -- source QQ213, --, therefor.

In Column 28, Line 64, delete "802.QQ2," and insert -- 802.11, --, therefor.

In Column 30, Line 13, delete "memory QQ390. Memory QQ390" and insert -- memory QQ390-1. Memory QQ390-1 --, therefor.

In Column 34, Line 31, delete "embodiments" and insert -- embodiments. --, therefor.

In Column 35, Line 3, delete "embodiments" and insert -- embodiments. --, therefor.

In Column 35, Line 31, delete "embodiments" and insert -- embodiments. --, therefor.

In Column 35, Line 66, delete "according" and insert -- according to --, therefor.

In Column 36, Line 57, delete "Repeal" and insert -- Repeat --, therefor.

In Column 36, Line 66, delete "sendee" and insert -- service --, therefor.

In Column 37, Line 56, delete "Self Optimized" and insert -- Self-Organizing --, therefor.

In Column 38, Line 4, delete "Wide" and insert -- Wideband --, therefor.

In Column 38, Line 5, delete "Wide" and insert -- Wireless --, therefor.